United States Patent
Lee et al.

(10) Patent No.: US 6,840,318 B2
(45) Date of Patent: Jan. 11, 2005

(54) METHOD FOR TREATING SUBTERRANEAN FORMATION

(75) Inventors: Jesse Lee, Sugar Land, TX (US); Erik Nelson, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/177,815

(22) Filed: Jun. 20, 2002

(65) Prior Publication Data

US 2003/0234103 A1 Dec. 25, 2003

(51) Int. Cl.[7] .......................... E21B 33/13; E21B 43/25; C04B 7/00
(52) U.S. Cl. ....................... 166/293; 166/308
(58) Field of Search ................... 166/293, 308, 166/309

(56) References Cited

U.S. PATENT DOCUMENTS

| | | | | |
|---|---|---|---|---|
| 3,958,638 A | | 5/1976 | Johnston ................... 166/294 |
| 4,036,401 A | | 7/1977 | Nachtigall, Jr. .............. 221/150 |
| 4,741,401 A | * | 5/1988 | Walles et al. ................ 166/300 |
| 4,770,796 A | * | 9/1988 | Jacobs ........................ 507/260 |
| 5,102,558 A | * | 4/1992 | McDougall et al. ......... 507/260 |
| 5,102,559 A | * | 4/1992 | McDougall et al. ......... 507/260 |
| 5,110,486 A | * | 5/1992 | Manalastas et al. ......... 507/260 |
| 5,192,615 A | * | 3/1993 | McDougall et al. ... 428/402.24 |
| 5,204,183 A | * | 4/1993 | McDougall et al. ... 428/402.24 |
| 5,370,184 A | * | 12/1994 | McDougall et al. ......... 166/278 |
| 5,497,830 A | * | 3/1996 | Boles et al. ................. 166/300 |
| 5,580,844 A | * | 12/1996 | Swarup et al. .............. 507/201 |
| 5,591,700 A | * | 1/1997 | Harris et al. ................ 507/214 |
| 6,140,277 A | * | 10/2000 | Tibbles et al. .............. 507/201 |
| 6,265,355 B1 | * | 7/2001 | Lai et al. ..................... 507/237 |
| 6,399,546 B1 | * | 6/2002 | Chang et al. ............... 507/240 |
| 6,599,863 B1 | * | 7/2003 | Palmer et al. ............... 507/219 |
| 2002/0004464 A1 | * | 1/2002 | Nelson et al. .............. 507/200 |
| 2002/0193257 A1 | * | 12/2002 | Lee et al. .................... 507/200 |

FOREIGN PATENT DOCUMENTS

EP 0275624 7/1987

* cited by examiner

Primary Examiner—Robert J. Sandy
Assistant Examiner—Katherine Mitchell
(74) Attorney, Agent, or Firm—Thomas O. Mitchell; Robin Nava; Brigitte L. Echols

(57) ABSTRACT

A method is given in which there is delayed release from the treatment fluid of solid chemicals that are obtained in bulk powder form. The method is used in situations in which it is difficult to encapsulate the chemical to achieve delayed release because the chemical is obtained in powdered form. The method involves delivering the powdered chemical in capsules consisting of encapsulated granulates obtained by aggregating the bulk powder under pressure to form a densified material and, optionally, then dry comminuting the densified material to produce granulates of the desired size. The treatment is hydraulic fracturing and the chemical is a breaker, or the treatment is well cementing and the chemical is a dispersing agent, fluid loss control additive, set accelerator, or extender.

6 Claims, 1 Drawing Sheet

METHOD FOR TREATING SUBTERRANEAN FORMATION

FIELD OF THE INVENTION

The present invention relates to the art of treating subterranean formations and more particularly, to a method of delivering material into a formation with a controlled delayed release. The invention is in particular applicable to the preparation of encapsulated breaking agents.

BACKGROUND OF THE INVENTION

Hydraulic fracturing of subterranean formations has long been established as an effective means to stimulate the production of hydrocarbon fluids from a wellbore. In hydraulic fracturing, a well stimulation fluid (generally referred to as a fracturing fluid) is injected into and through a wellbore and against the surface of a subterranean formation penetrated by the wellbore at a pressure at least sufficient to create a fracture in the formation. Usually a "pad fluid" is injected first to create the fracture and then a fracturing fluid, often bearing granular propping agents, is injected at a pressure and rate sufficient to extend the fracture from the wellbore deeper into the formation. If a proppant is employed, the goal is generally to create a proppant filled zone from the tip of the fracture back to the wellbore. In any event, the hydraulically induced fracture is more permeable than the formation and it acts as a pathway or conduit for the hydrocarbon fluids in the formation to flow to the wellbore and then to the surface where they are collected.

The fluids used as fracturing fluids have also been varied, but many if not most are aqueous based fluids that have been "viscosified" or thickened by the addition of a natural or synthetic polymer (crosslinked or uncrosslinked) or a viscoelastic surfactant. The carrier fluid is usually water or a brine (e.g., dilute aqueous solutions of sodium chloride and/or potassium chloride).

The viscosifying polymer is typically a solvatable (or hydratable) polysaccharide, such as a galactomannan gum, a glycomannan gum, or a cellulose derivative. Examples of such polymers include guar, hydroxypropyl guar, carboxymethyl guar, carboxymethylhydroxyethyl guar, hydroxyethyl cellulose, carboxymethylhydroxyethyl cellulose, hydroxypropyl cellulose, xanthan, polyacrylamides and other synthetic polymers. Of these, guar and hydroxypropyl guar are typically preferred because of commercial availability and cost performance.

In many instances, if not most, the viscosifying polymer is crosslinked with a suitable crosslinking agent. The crosslinked polymer has an even higher viscosity and is even more effective at carrying proppant into the fractured formation. The borate ion has been used extensively as a crosslinking agent, typically in high pH fluids, for guar, guar derivatives and other galactomannans. Other crosslinking agents include, for example, titanium, chromium, iron, aluminum, and zirconium.

Viscoelastic surfactant fluids are normally made by mixing into the carrier fluid appropriate amounts of suitable surfactants such as anionic, cationic, nonionic and zwitterionic surfactants. The viscosity of viscoelastic surfactant fluids is attributed to the three dimensional structure formed by the components in the fluids. When the concentration of viscoelastic surfactants significantly exceeds a critical concentration, surfactant molecules aggregate into micelles, which can become highly entangled to form a network exhibiting elastic behavior.

Viscoelastic surfactant solutions are usually formed by the addition of certain reagents to concentrated solutions of surfactants, frequently consisting of long-chain quaternary ammonium salts such as cetyltrimethylammonium bromide (CTAB). Common reagents that generate viscoelasticity in the surfactant solutions are salts such as ammonium chloride, potassium chloride, sodium salicylate and sodium isocyanate and non-ionic organic molecules such as chloroform. The electrolyte content of surfactant solutions is also an important control on their viscoelastic behaviour.

A key aspect of well treatment such as hydraulic fracturing is the "cleanup", e.g., removing the carrier fluid from the fracture (i.e., the base fluid without the proppant) after the treatment has been completed. Techniques for promoting fracture cleanup often involve reducing the viscosity of the fracture fluid as much as practical so that it will more readily flow back toward the wellbore.

Gel breakers are of common use for conventional polymer based fluids used in stimulation and the like since, unlike viscoelastic surfactant based fluids, conventional polymer-based fluids do not spontaneously break when contacted by hydrocarbons or aqueous formation fluids and leaving a high viscosity fluid in the formation would result in a reduction of the formation permeability and, consequently, a decrease of the production. The most widely used breakers are oxidizers and enzymes. The breakers can be dissolved or suspended in the liquid (aqueous, non-aqueous or emulsion) phase of the treating fluid and exposed to the polymer throughout the treatment (added "internally"), or exposed to the fluid at some time after the treatment (added "externally").

The most common external methods and compositions involve encapsulated enzymes or encapsulated oxidizers or involve the use of pre- or post-flushes that contain breakers. Breaking can occur in the wellbore, gravel pack, filter cake, the rock matrix, in a fracture, or in another added or created environment. See, for example, U.S. Pat. No. 4,741,401 (Walles et al.), assigned to Schlumberger Dowell and incorporated herein by reference.

Though viscoelastic-based fracturing fluids are spontaneously broken by hydrocarbon fluids contained in the formation fluids, it is sometimes suitable to better control the breaking. In U.S. patent application Ser. No. 09/826,127, published Jan. 10, 2002 under number 20020004464, incorporated herein by reference, several types of breakers are proposed including encapsulated salts such as ammonium persulfate, sodium salicylate, inorganic salts such as $NaPF_6$ (sodium hexafluorophosphate) and KCl (potassium chloride).

Several mechanisms are typically involved in the release of an encapsulated material. Those mechanisms typically involve partial dissolution of the capsule enclosures, osmotic or chemical diffusion. However, since it is suitable that the breaking occurs no later than at the end of the fracturing operation, when the fracture closes due to formation pressure, a key mechanism is the release of the breaking agent through the rupture of the enclosure or encapsulating coating. Obviously, the bigger the capsules, the higher their probability of being crushed during the fracture closure. On the other hand, the encapsulated breaker has to be pumped downhole and therefore, as a rule, the size of the capsules of breakers is chosen similar to the size of the proppant.

The most commonly used proppant is made of sand grains having a size ranging between about 0.1 mm and about 2 mm, and most commonly between 0.2 mm and 0.5 mm. Therefore, when a new material is studied to determine its suitability as an encapsulated breaker, a crucial limitation is its availability as granules with sufficient strength to survive the encapsulation process. Many solid materials are actually only available in powder form, passing through a sieve having an opening corresponding to 250 mesh according to the ASTM standard, or in other words, consisting of particles mostly ranging between 0.03 mm and 0.05 mm.

It should be further emphasized that even if the principal mechanism of release of breaking agent that is contemplated is not through crushing due to fracture closure but for instance, through dissolution or leakage of the enclosure; for an effective encapsulation almost all particles have to be coated to prevent failure of the whole fracturing operation. Coating a powder-like material usually results in some particles being uncoated or incompletely coated, at least using affordable technologies. Therefore, the breaking agent prematurely reacts with the crosslinked polymers so that the fluid may lose its suspending properties well before the proppant is properly placed in the fracture.

In the context of other fluid used in well services operations, such as cementing fluids, delayed release of some additives such as accelerators is also suitable. Though the particle size is not as critical as for fracturing fluids, it would be advantageous to be able to deliver some additives in encapsulated form.

The need for improved well services fluids still exists, and the need is met at least in part by the following invention.

SUMMARY OF THE INVENTION

It has been found that a large variety of solid chemicals available in a bulk powder form could be added to subterranean treatment fluids with delayed release when said chemicals are delivered as capsules consisting of encapsulated granulates obtained by aggregating the bulk powder under pressure to form a densified material and optionally, dry comminuting said densified material to produce granulates at the desired size.

Depending on the desired size, the densified material is obtained by roll compacting the bulk powder in a dry process to form a compacted sheet, which is then dry comminuted into granulates. As long as the extruded densified materials are larger than or equal to the desired particle size, it is not necessary to have a sheet prior to granulation, so that for instance, briquettes larger than 20 mesh can first be prepared and then reduced to a size of 20/40 mesh suitable for most well stimulating applications.

DETAILED DESCRIPTION OF THE INVENTION

Figure 1:
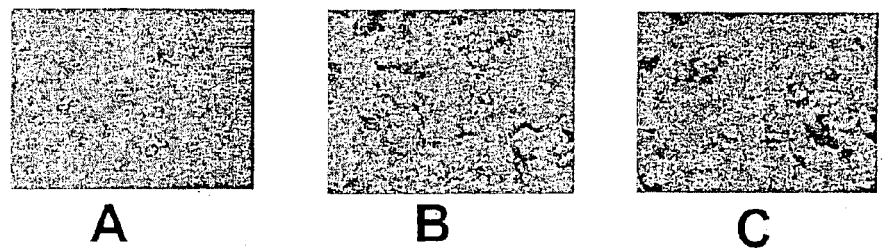
FIG. 1 is a microscopic view (scale X60) of a powder (A), agglomerated with a binding material (B) and coated (C).
Figure 2:
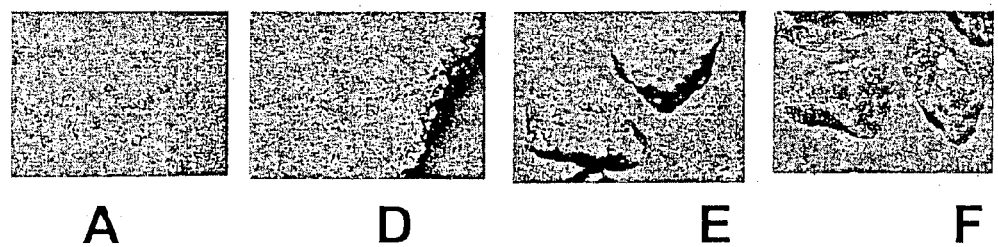
FIG. 2 is a microscopic view (scale X60) of a powder (A), compacted into a sheet (D), granulated (E) and coated (F) according to the present invention.
Figure 3:
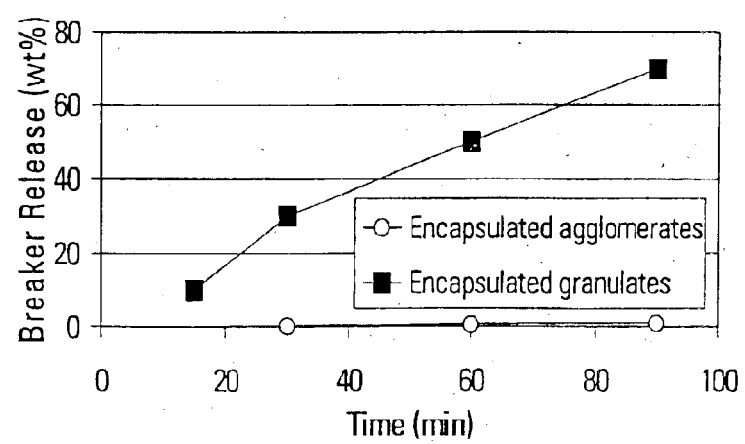
FIG. 3 plots the percent of breaker released vs. time in minutes with encapsulated agglomerates (open circles) and encapsulated granulates (filled squares).

An inorganic sulfonate that is only available in powder form (having an average particle size of about 250 mesh) is shown in A in FIGS. 1 and 2. It can be agglomerated with binding material to produce particles in the size range of 20/40 mesh (B). However, the shape of the agglomerates is too irregular for encapsulation and the particles are also too weak to undergo the coating process. Part of the agglomerates will survive the coating process (C). However, the release rate is very fast even with high coating level (FIG. 3, solid squares).

In the context of well stimulation, the coating material preferably releases the encapsulated granulates to the well treatment fluid essentially by the crushing of the capsules due to the closure of the formation. In other cases, said enclosure is degraded under the conditions of pressure and temperature existing in the subterranean formation. Of course, a combination of the two release mechanisms, and others such as osmosis, may also occur and be favored depending on the applications.

The same material (A) can be processed into a densified sheet (D), which is then granulated into 10/40 mesh (E). These resulting particles are strong and can be encapsulated successfully at reasonable coating levels (F). As shown in FIG. 3, open circles, in the absence of a closure pressure, the core material release rate is almost nil.

The densified sheet is prepared by dry roll-compaction. In this process, the powder is typically pre-processed for pre-compaction and deaeration. Then the powder is fed to the nip of compaction rolls capable of applying a compaction force of several metric tons to form a sheet-like structure having a thickness of about 2 mm. The sheet may be broken into smaller sheets that are fed to crushing rolls that break them into granules. The powder is preferably precompacted and dearated before being delivered, for instance through a screw feeder into the roll nip area and seal system.

This dry process, known for years in the manufacture of fertilizers and pharmaceutical products, allows the fabrication of extremely dense granules that can easily receive a relatively uniform coating. Consequently, high coating levels are not required and the coating thickness may be adjusted as a function of the expected release time.

In some cases, a binder may be used to make the powder particles more "sticky".

The dry-roll compaction process allows the use of numerous chemicals that are chemically suitable as additives for oilfield services but only available as bulk powder. As a result, it is now possible to achieve controlled release of a much wider selection of chemicals.

Examples of such materials include gel breakers such as polyelectrolytes (cationic or anionic), ionomers, nonionic polymers, and oxidizers. Other applications include well cementing additives such as retarders, dispersing agents, fluid-loss control additives, set-accelerators, or extenders.

Examples of gel breakers are listed in the following table 1:

TABLE 1

| Poly-electrolytes | Cationic | Poly(2-vinylimidazolinium salt) |
| --- | --- | --- |
| | | Poly(N-vinylimidazolinium salt) |
| | | Poly(1-vinyl-2-methyl-2-imidazolium salt) |
| | | Poly(N-vinylpiperidine) |
| | Anionic | Poly(acrylic acid) and its salts |
| | | Poly(methacrylic acid) and its salts |
| | | Poly(itaconic acid) and its salts |
| | | Poly(crotonic acid) and its salts |
| | | Poly(3-acrylamido-3-methylbutanoic acid) and its salts |
| | | Poly(3-methacrylamido-3-methylbutanoic acid) and its salts |
| | | Poly(naphthalene sulfonic acid) and its salts |
| | | Poly(styrene sulfonic acid) and its salts |
| | | Poly(ligno sulfonic acid) and its salts |
| Ionomers | | Poly(4-vinylpyridine) |

TABLE 1-continued

| | |
|---|---|
| | Poly(ethylene-co-methacrylic acid) and its salts |
| | Poly(ethyl acrylate-co-4-vinylpyridine) |
| | Poly(ethyl acrylate-co-N-methyl-4-vinylpyridinum iodide) |
| | Poly(ethylene terephthalate-co-zinc sulfonate) |
| | Poly(styrene-co-methacrylic acid) and its salts |
| | Poly(styrene-co-styrenesulfonate) |
| | Polyamide-6 |
| | Poly(ethyl acrylate) |
| Nonionic | Poly(ethyleneoxide) |
| polymers | Poly(propylene oxide) |
| Oxidizers | Sodium peroxide |
| | Barium peroxide |
| | Hydrogen peroxide urea adduct |
| | Magnesium peroxide |
| | Potassium chlorate |
| | Potassium chromate |
| | Potassium dichromate |
| | Potassium iodate |
| | Nitrate |
| | Potassium nitrite |
| | Sodium perborate |
| | Oxides such as: Chromium oxides, Magnesium oxides, Manganese oxides, Molybdenum oxides, Ferric oxides, Cobalt oxides, Tungsten oxides, Osmium oxides, Rhodium oxides, Iridium oxides, Ruthenium oxides, Nickel oxides, Zinc oxides, Zirconium oxides, Titanium oxides, Boron oxides, Beryllium oxides, Calcium oxides, Barium oxides, and Aluminum oxides |

Among the materials listed above, salts of polynaphthalene sulfonic acid, having a molecular weight of about 7000 and salts of poly(styrene sulfonic acid) having a molecular weight of about 70,000 are more particularly preferred to be used as a breaker for zwitterionic surfactants such as betaine surfactants.

With well cementing, the delayed release of additives can result in improved control of cement slurry performance. For example, the performance of cement retarders can be improved by delaying their release until the cement has undergone the initial hydration period. Delayed release of accelerators can lead to improved control of the set time. Similar improvements in efficiency can be realized by delaying the release of fluid-loss additives, dispersants, etc. The particle size of the encapsulated granules is not as important for cementing as it is for encapsulated breakers for fracturing fluids. A wide range of particle sizes may be appropriate. Examples of additives suitable, for instance, in well cementing are listed in the following table 2:

TABLE 2

| | |
|---|---|
| Retarders/Dispersants | Sodium lignosulfonate |
| Fluid-Loss Control | hydroxyethylcellulose |
| Additives | hydroxypropylcellulose |
| | xanthans |
| | AA/AMPS copolymers |
| | carboxymethylhydroxyethylcellulose |
| | sulfonated polystyrene |
| | sulfonated copolymer of styrene/maleic anhydride |
| | sulfonated polyvinyltoluene |
| Accelerators | Aluminum sulfate |
| | Formate salts |
| | Aluminum chloride |
| | Iron sulfate |
| Extenders | Bentonite |
| | Superabsorbent polymers |
| | Attapulgite |

For a delayed release of the additive, the enclosure member is a key element. This enclosure is suitably any coating applied by a process that provides a substantially uniform coating or encapsulation of individual particulate materials between 100 mesh to 5 mesh. By varying the coating thickness, the release characteristics can be varied to a large extent. A shorter release time will be obtained by a thinner coating.

Two main types of coating process, top spray and bottom spray, are characterized by the location of the spray nozzle at the bottom or the top of a fluidized bed of solid particles. The nozzle sprays an atomized flow of coating solution while the particles are suspended in the fluidizing air stream that carries the particles past the spray nozzle. The particles then collide with the atomized coating material as they are carried away from the nozzle in a cyclic flow. The temperature of the fluidizing air is set to evaporate solution or suspension liquid media or solidify the coating material shortly after colliding with the particles. The solidified coating materials will cover the particles gradually. This process is continued until each particle is coated uniformly to the desired coating thickness.

The properties of the coated particles can be tuned with the coating formulation, processing conditions, and layering with different coating materials. The choice of material will depend on a variety of factors such as the physical and chemical properties of the material being employed. Coating material can be from one of these categories: aqueous and organic solutions, dispersions, and hot melts. Non-limiting examples include acrylics, halocarbon, polyvinyl alcohol, Aquacoat® aqueous dispersions, hydrocarbon resins, polyvinyl chloride, Aquateric® enteric coatings, HPC, polyvinylacetate phthalate, HPMC, polyvinylidene chloride, HPMCP, proteins, Kynar®, fluoroplastics, rubber (natural or synthetic), caseinates, maltodextrins, shellac, chlorinated rubber, silicone, Coateric® coatings, microcrystalline wax, starches, coating butters, milk solids, stearines, Daran® latex, molasses, sucrose, dextrins, nylon, surfactants, Opadry® coating systems, Surelease® coating systems, enterics, Paraffin wax, Teflon® fluorocarbons, Eudragits® polymethacrylates, phenolics, waxes, ethoxylated vinyl alcohol, vinyl alcohol copolymer, polylactides, zein, fats, polyamino acids, fatty acids, polyethylene gelatin, polyethylene glycol, glycerides, polyvinyl acetate, vegetable gums and polyvinyl pyrrolidone.

What is claimed is:

1. A method for treating a subterranean formation which comprises injecting into the subterranean formation a well treatment fluid comprising a viscoelastic surfactant and a solid additive available in a bulk powder form, wherein said solid additive is a viscoelastic surfactant gel breaker, selected from the group consisting of non-ionic polymers, ionomers, cationic polyelectrolytes, and anionic polyelectrolytes, said method further comprising the steps of aggregating said bulk powder under pressure to form a densified material, forming granulates of said densified material which are further encapsulated to form capsules, said method further comprising the step of delivering said capsules into an enclosure for a delayed release of said additive from said capsules.

2. The method of claim 1, wherein the treatment is hydraulic fracturing and granulates are in the size range of 20/40 mesh.

3. The method of claim 1, wherein said additive is a cationic polyelectrolyte selected from the group consisting of poly(2-vinylimidazolinium salt), poly(N-vinylimidazolium salt), poly(1-vinyl-2-methyl-2-imidazolium salt) and poly(N-vinylpiperidine).

4. The method of claim 1, wherein said additive is an anionic polyelectrolyte selected from the group consisting of poly(acrylic acid) and its salts, poly(methacrylic acid) and its salts, poly(itaconic acid) and its salts, poly(crotonic acid) and its salts, poly(3-acrylamido-3-methylbutanoic acid) and its salts, poly(3-methacrylamido-3-methylbutanoic acid) and its salts, polynaphthalene sulfonic acid) and its salts, poly(ligno sulfonic acid) and its salts and poly(styrene sulfonic acid) and its salts.

5. The method of claim 1, wherein said additive is an ionomer selected from the group consisting of poly(4-vinylpyridine), poly(ethylene-co-methacrylic acid) and its salts, poly(ethyl acrylate-co-4-vinylpyridine), poly(ethyl acrylate-co-N-methyl-4-vinylpyridinum iodide), poly(ethylene terephthalate-co-zinc sulfonate), poly(styrene-co-methacrylic acid) and its salts, poly(styrene-co-styrenesulfonate), polyamide-6, and poly(ethyl acrylate).

6. The method of claim 1, wherein said additive is a nonionic polymer selected from the group consisting of poly(ethyleneoxide) and polypropylene oxide.

\* \* \* \* \*